(12) United States Patent
Takenaka et al.

(10) Patent No.: US 10,744,846 B2
(45) Date of Patent: Aug. 18, 2020

(54) VEHICULAR MANIPULATION APPARATUS

(71) Applicant: DENSO CORPORATION, Kariya, Aichi-pref. (JP)

(72) Inventors: Kenichi Takenaka, Kariya (JP); Yukihide Ota, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 29 days.

(21) Appl. No.: 16/318,392

(22) PCT Filed: Jun. 9, 2017

(86) PCT No.: PCT/JP2017/021415
§ 371 (c)(1),
(2) Date: Jan. 17, 2019

(87) PCT Pub. No.: WO2018/016220
PCT Pub. Date: Jan. 25, 2018

(65) Prior Publication Data
US 2019/0255909 A1 Aug. 22, 2019

(30) Foreign Application Priority Data
Jul. 19, 2016 (JP) ................................ 2016-141644

(51) Int. Cl.
*B60H 1/00* (2006.01)
*B60K 35/00* (2006.01)
(Continued)

(52) U.S. Cl.
CPC .......... *B60H 1/00585* (2013.01); *B60H 1/00* (2013.01); *B60K 35/00* (2013.01); *B60R 16/037* (2013.01);
(Continued)

(58) Field of Classification Search
CPC ...... B60H 1/00; B60H 1/00585; B60K 35/00; B60K 2370/1446; B60K 2370/168;
(Continued)

(56) References Cited

U.S. PATENT DOCUMENTS 7,554,521 B1\* 6/2009 Migos ................. G06F 3/04847
345/156
8,665,203 B2\* 3/2014 Abe ..................... G09G 3/3406
345/102
(Continued)

FOREIGN PATENT DOCUMENTS

JP 2005038267 A 2/2005
JP 2006226953 A 8/2006
(Continued)

*Primary Examiner* — Quan-Zhen Wang
*Assistant Examiner* — Mancil Littlejohn, Jr.
(74) *Attorney, Agent, or Firm* — Harness, Dickey & Pierce, P.L.C.

(57) ABSTRACT

A vehicular manipulation apparatus, which manipulates a different apparatus, includes a manipulation unit, a communication unit, a display unit, and a controller. The manipulation unit accepts a manipulation and inputs a set value step-by-step for controlling the different apparatus. The communication unit communicates with the different apparatus, transmits manipulation information to the different apparatus, and receives a set value of the different apparatus. The display unit digitally displays the set value. The controller controls an image on the display unit using the set value. In displaying change due to the manipulation step-by-step, the controller broadens a change width between steps in cases where the manipulation amount within a threshold period of time is equal to or greater than a threshold manipulation amount, as compared with cases where the manipulation amount within the threshold period of time is less than the threshold manipulation amount.

17 Claims, 10 Drawing Sheets

(51) Int. Cl.
*B60R 16/037* (2006.01)
*G06F 3/0362* (2013.01)
*G06F 3/0484* (2013.01)
*G06F 3/0487* (2013.01)
*B60R 16/02* (2006.01)

(52) U.S. Cl.
CPC .......... *G06F 3/0362* (2013.01); *G06F 3/0484* (2013.01); *G06F 3/0487* (2013.01); *G06F 3/04847* (2013.01); *B60K 2370/12* (2019.05); *B60K 2370/126* (2019.05); *B60K 2370/128* (2019.05); *B60K 2370/1446* (2019.05); *B60K 2370/1537* (2019.05); *B60K 2370/168* (2019.05); *B60R 16/02* (2013.01)

(58) Field of Classification Search
CPC ........ B60K 2370/12; B60K 2370/1537; B60K 2370/126; B60K 2370/128; B60R 16/02; B60R 16/037; G06F 3/0362; G06F 3/0484; G06F 3/04847; G06F 3/0487
See application file for complete search history.

(56) References Cited

U.S. PATENT DOCUMENTS

| | | | |
|---|---|---|---|
| 8,933,887 B2 * | 1/2015 | Umemoto | G05B 19/0428 345/167 |
| 2008/0264079 A1 * | 10/2008 | Takenaka | B60H 1/00985 62/127 |
| 2012/0050156 A1 | 3/2012 | Umemoto et al. | |

FOREIGN PATENT DOCUMENTS

| | | |
|---|---|---|
| JP | 2008098044 A | 4/2008 |
| JP | 2012048374 A | 3/2012 |
| JP | 2013052815 A | 3/2013 |
| JP | 5461030 B2 | 4/2014 |
| WO | WO-2017104208 A1 | 6/2017 |

* cited by examiner

TRANSITION TIME ACCORDING TO MANIPULATION AMOUNT

| MANIPULATION AMOUNT (PLUS OR MINUS) | TRANSITION TIME(ms) /1 STEP | TOTAL TRANSITION TIME (ms) |
|---|---|---|
| 1 | 200 | 200 |
| 2 | 100 | 200 |
| 3 | 100 | 300 |
| 4 | 100 | 400 |
| 5 | 100 | 500 |
| 6 | 100 | 500 |
| 7 | 100 | 500 |

FIG. 12

| PATTERN 1 | PATTERN 2 | PATTERN 3 |
|---|---|---|
| 19.5 | 19.5 | 28.5 |
| ⇩ | ⇩ | ⇩ |
| 19.5 | 19.5 | 28.5 / 30.0 |
| ⇩ | ⇩ | ⇩ |
| 19.0 | 19.0 | 30.0 |
| | ⇩ | |
| | 19.0 | |

VEHICULAR MANIPULATION APPARATUS

CROSS REFERENCE TO RELATED APPLICATIONS

This application is a U.S. National Phase Application under 35 U.S.C. 371 of International Application No. PCT/JP2017/021415 filed on Jun. 9, 2017. This application is based on and claims the benefit of priority from Japanese Patent Application No. 2016-141644 filed on Jul. 19, 2016. The entire disclosures of all of the above applications are incorporated herein by reference.

TECHNICAL FIELD

The present disclosure relates to a vehicular manipulation apparatus for manipulating an apparatus mounted on a vehicle.

BACKGROUND ART

There is conventionally known a manipulation apparatus, for example, as described in Patent literature 1. The manipulation apparatus in Patent literature 1 includes a rotary switch which partly projects from the upper surface of the casing and is rotated by a manipulator, and a rotation detection mechanism for detecting the rotation state of the rotary switch. A display unit is installed adjacent to the rotary switch; when a rotating manipulation is made to the rotary switch, the numerical value displayed on the display unit changes or the display content changes according to the rotating manipulation.

PRIOR ART LITERATURE

Patent Literature

Patent literature 1: JP 2008-098044 A

SUMMARY OF INVENTION

In a vehicular air-conditioning apparatus, the set temperature may be adjusted by rotating a rotary switch. When the rotary switch is rotated, the manipulation apparatus transmits the rotated state to the vehicular air-conditioning apparatus. Then, the vehicular air-conditioning apparatus changes the set temperature based on the received information and transmits the change result to the manipulation apparatus. The display unit of the manipulation apparatus then changes the displayed image while transitioning step-by-step from the present set temperature to the latest set temperature.

Such a configuration takes a period of time from when the rotary switch is manipulated to when the latest set temperature is displayed, providing a user with a feeling of strangeness. As the change amount in the set temperature is greater, the delay in the change in the displayed image is more remarkable.

Also, the displayed image is not changed until the change result is received from the vehicular air-conditioning apparatus after the rotary switch is manipulated. The displayed image is thus changed with a slight delay from the manipulation by the user. This causes the user to feel strange.

It is an object of the present disclosure to provide a vehicular manipulation apparatus capable of reducing a delay arising from when the manipulation unit is manipulated to when a displayed image is changed.

According to an example of the present disclosure, a vehicular manipulation apparatus for manipulating a different apparatus mounted to a vehicle is provided to include a manipulation unit, a communication unit, a display unit, and a controller. The manipulation unit accepts a manipulation and inputs a set value of a control parameter step-by-step for controlling the different apparatus. The communication unit communicates with the different apparatus, transmits manipulation information including a manipulation amount of the manipulation accepted by the manipulation unit to the different apparatus, and receives a set value of the different apparatus. The display unit digitally displays the set value received by the communication unit. The controller controls an image displayed on the display unit using the set value received by the communication unit. In displaying a change due to the manipulation step-by-step, the controller broadens a change width between steps in cases where the manipulation amount within a predetermined threshold period of time is equal to or greater than a predetermined threshold manipulation amount, as compared with cases where the manipulation amount within the threshold period of time is less than the threshold manipulation amount.

According to such an example, the controller displays the change due to the manipulation step-by-step by using a plurality of steps with a change width between the steps. Under states where the controller displays the change step-by-step, the controller the controller broadens the change width in cases where the manipulation amount within a predetermined threshold period of time is equal to or greater than a predetermined threshold manipulation amount, as compared with cases where the manipulation amount within the threshold period of time is less than the threshold manipulation amount. Suppose a case where the threshold manipulation amount is great. In such a case, part of set values to be displayed is thinned out, for instance, by broadening the change width between the steps by incrementing two instead of by incrementing one. The stepwise display change is thus completed within a predetermined period of time. Even if the manipulation amount is great, the latest set value can be displayed in a short time. This can reduce the delay from the user's manipulation to the change in the displayed image, thereby enabling the reduction in the strangeness given to the user.

BRIEF DESCRIPTION OF THE DRAWINGS

The above and other objects, features and advantages of the present disclosure will become more apparent from the following detailed description made with reference to the accompanying drawings.

FIG. 12 is examples of images displayed on a display unit;

EMBODIMENT FOR CARRYING OUT INVENTION

The following describes embodiments for carrying out the present disclosure with reference to the drawings. In each embodiment, a part corresponding to the part described in the preceding embodiment may be denoted by the same reference symbol or a reference symbol with one character added to the preceding reference symbol; thereby, redundant explanation may be abbreviated. In each embodiment, when only part of the configuration is described, the other part of the configuration can be the same as that in the preceding embodiment described above. The present disclosure is not limited to combinations of embodiments which combine parts that are explicitly described as being combinable. As long as no problems are present, the various embodiments may be partially combined with each other even if not explicitly described.

First Embodiment

Figure 1:
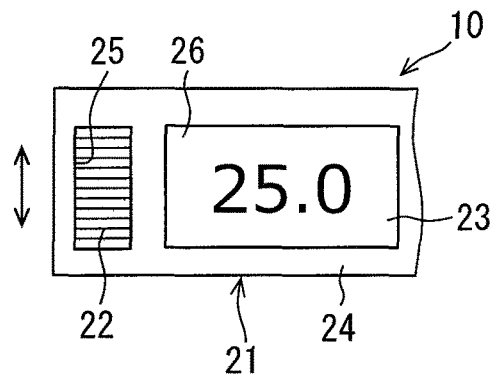
FIG. 1 is a diagram showing a vehicular manipulation apparatus.

The following describes a first embodiment according to the present disclosure with reference to FIGS. 1 to 13. The vehicular manipulation apparatus 10, which is mounted to a vehicle, is an apparatus to change and input a set value of a predetermined control parameter in a vehicular air-conditioning apparatus 11. The vehicular manipulation apparatus 10 is arranged in a center console of the vehicle. The vehicular manipulation apparatus 10 changes the setting of the temperature of a conditioned air of the vehicular air-conditioning apparatus 11, for example, as a predetermined control parameter. The vehicular manipulation apparatus 10 is thus also referred to as an air conditioner panel. As shown in FIG. 1, the vehicular manipulation apparatus 10 includes a casing 21, a rotary switch 22, and a display unit 23, as members constituting an external appearance.

The casing 21 is a box-like member for internally accommodating the respective members constituting the vehicular manipulation apparatus 10; the casing 21 includes a manipulation surface 24 and an opening 25. The manipulation surface 24 is a surface facing a manipulator (i.e., an occupant) of the vehicular manipulation apparatus 10, and constitutes a manipulation panel for air conditioning. The manipulation surface 24 has a surface primarily including a region applied with a light shielding paint to serve as a light shielding portion. In contrast, the surface including a different region corresponding to the display unit 23 in the manipulation surface 24; the different region is applied with no light-shielding paint to serve as a light transmitting portion 26.

The opening 25 is a hole for allowing a part of the rotary switch 22 to protrude toward the occupant. Between the opening 25 and the rotary switch 22, a gap is formed along the periphery of the opening 25. A part of the rotary switch 22 protrudes from the opening 25; the rotary switch 22 is supported by a shaft extending in a left-right direction in FIG. 1 and in a direction along the manipulation surface 24 in the casing 21. The rotary switch 22 is an input switch for setting a temperature of a conditioned air by a rotating manipulation by the occupant. The rotary switch 22 is also referred to as a manipulation unit, a manipulation switch, or a manipulation interface; the rotary switch 22 can input a set temperature step-by-step. For example, suppose a case where the rotary switch 22 is rotated so as to move the manipulation point upward in FIG. 1. In such a case, the temperature of the conditioned air is set to increase by 0.5 degrees centigrade every a predetermined angle, for example, ten degrees of the rotation angle upward. By contrast, suppose a case where the rotary switch 22 is rotated so as to move the manipulation point downward in FIG. 1. In such a case, the temperature of the conditioned air is set to decrease by 0.5 degrees centigrade every ten degrees of the rotation angle downward.

Further, when the occupant rotates the rotary switch 22 with a fingertip, the occupant can obtain a click feeling during the rotating manipulation. Such a click feeling is obtained every time the rotary switch 22 is rotated by a predetermined angle, for example, 10 degrees. Setting the rotating manipulation to change 0.5 degrees centigrade every ten degrees of the rotation angle thereby enables the set temperature to be changed step-by-step in increments of 0.5 degrees centigrade.

The display unit 23 displays set values of the vehicular air-conditioning apparatus 11 as numerical values in a digital form. The display unit 23 displays an input state corresponding to the rotating manipulation of the rotary switch 22. The display unit 23 is arranged adjacent to the rear side of the manipulation surface 24 in one side in the axial direction of the rotary switch 22. As shown in FIG. 1, the display unit 23 displays a temperature of the conditioned air after the set change. The display unit 23 employs a self-luminous organic EL display having a flat plate shape. The display unit 23 displays an image visually recognized by the occupant via the light transmitting portion 26 in the manipulation surface 24.

Further, the manipulation surface 24 is provided with a switch portion for changing the set value of another control parameter of the vehicular air-conditioning apparatus 11 in a region opposite to the display unit 23 with respect to the rotary switch 22. Such a switch unit is, for example, an auto (AUTO) switch for setting an operation state of the vehicular air-conditioning apparatus 11 to an automatic control state. The switch section outputs an input signal when an input manipulation is performed by the occupant to the vehicular air-conditioning apparatus 11.

Figure 2:
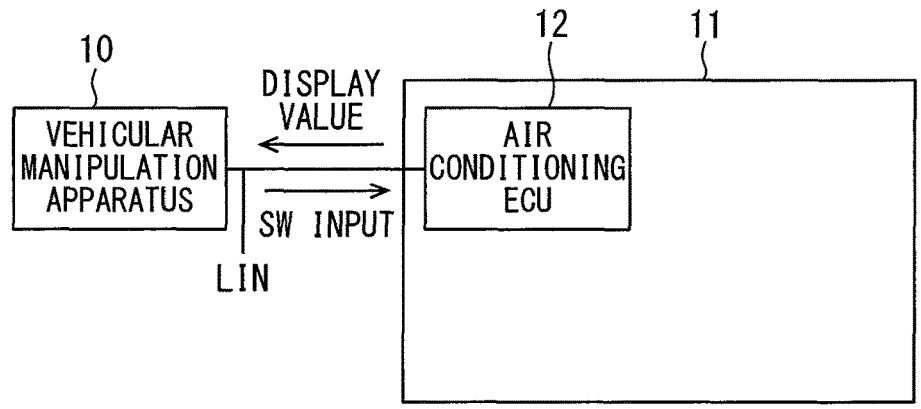
FIG. 2 is a diagram showing a connection relationship between a vehicular manipulation apparatus and an air-conditioner ECU.

As shown in FIG. 2, the vehicular manipulation apparatus 10 communicates with a different apparatus in compliance with a known LIN protocol. The different apparatus is, for example, the vehicular air-conditioning apparatus 11, and the vehicular manipulation apparatus 10 is communicably connected to an air conditioner ECU 12 that controls the vehicular air-conditioning apparatus 11. For example, when the rotary switch 22 is manipulated, the vehicular manipulation apparatus 10 transmits the rotation amount and the rotation direction to the air conditioner ECU 12. Further, the vehicular manipulation apparatus 10 periodically receives the information from the air conditioning ECU 12. The information to be received is a control parameter of the vehicular air-conditioning apparatus 11 and includes a set temperature. Note that "information" is used not only as an uncountable noun but also as a countable noun and is thus equivalent to an information item. One information is equivalent to one information item: a plurality of informations are equivalent to a plurality of information items.

Figure 3:
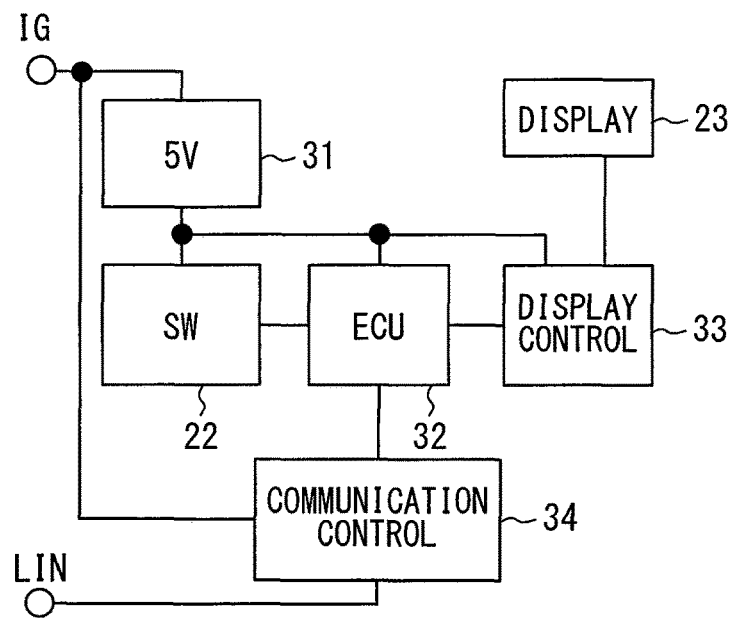
FIG. 3 is a block diagram showing an electrical configuration of a vehicular manipulation apparatus.

The following describes an electrical configuration of the vehicular manipulation apparatus 10 with reference to FIG. 3. The vehicular manipulation apparatus 10 is configured to include a 5V power supply circuit 31, a rotary switch 22, an ECU (Electronic Control Unit) 32, a display control IC (Integrated Circuit) 33, a communication control IC 34, and a display unit 23.

The 5V power supply circuit 31 generates a 5V voltage from an ignition power supply (IG) and supplies it to each component in the vehicular manipulation apparatus 10 as an operation voltage. When the rotary switch 22 accepts a rotating manipulation as described above, the rotation amount and rotation direction of the rotating manipulation are provided to the ECU 32 as the manipulation information.

The communication control IC 34, which is also referred to as a communication controller, a communication unit, or a communication device, outputs the information processed by the ECU 32 to the LIN, while also receiving the information outputted to the LIN from a different in-vehicle apparatus. The communication control IC 34 communicates with the air conditioner ECU 12, transmits the manipulation information including the manipulation amount of the manipulation accepted by the rotary switch 22 to the air conditioner ECU 12, and receives the set temperature determined according to the manipulation information from the air conditioner ECU 12. The communication control IC 34 gives the received information to the ECU 32.

The ECU 32, which is also referred to as a controller, controls an image displayed on the display unit 23 using the set value received by the communication control IC 34. The ECU 32 transmits the image information for displaying an image on the display unit 23 to the display control IC 33. In the present embodiment, as an example, the ECU 32 is configured by a microcomputer including a CPU, a ROM, a RAM, input/output interfaces, and the like; the ECU 32 realizes functions with the software recorded in the ROM or the like. In contrast, the ECU 32 may implement some or all of the functions not by a microcomputer but by one or more hardware devices.

The display control IC 33, which is also referred to as a display controller, controls an image to be displayed on the display unit 23. The display control IC 33 forms an image to be displayed based on an instruction from the ECU 32. The display unit 23 displays an image given from the display control IC 33.

Figure 4:
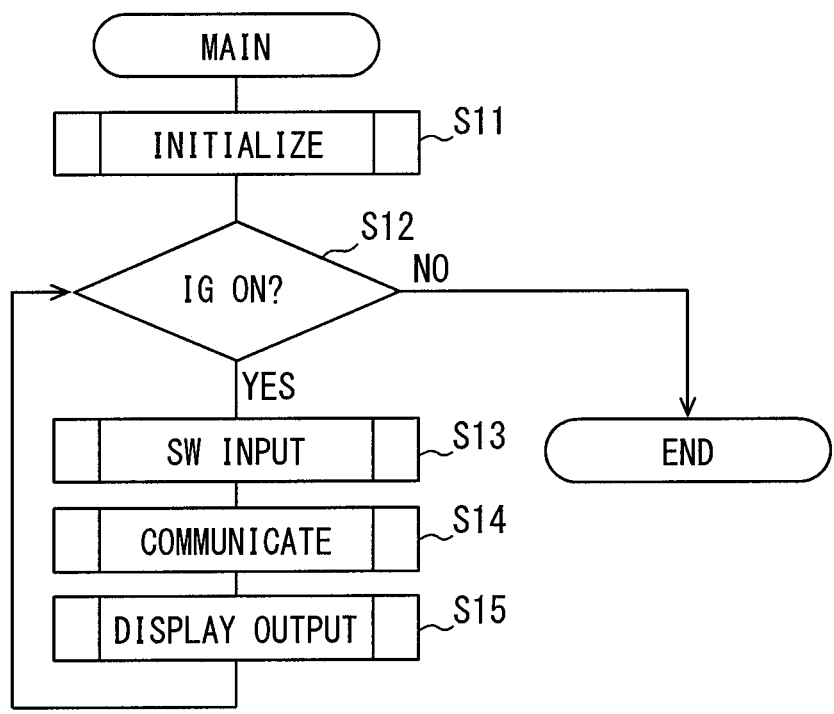
FIG. 4 is a flowchart showing a main process of a vehicular manipulation apparatus.

The following describes a main process by the ECU 32 with reference to FIG. 4. The flowchart shown in FIG. 4 is started when the electric power is supplied to the vehicular manipulation apparatus 10.

The described flowchart includes a plurality of sections (also referred to as steps); each section is represented, for instance, as S11. Further, each section can be divided into several subsections, while several sections can be combined into one section. Each section can also be referred to as a device, a module, a unit, a specific name, or a specific name with a structural modifier. A detection section can be referred to as a detection device, a detection unit, or a detector. Also, the section may be achieved as (i) a software section in combination with a hardware unit (e.g., computer) or (ii) a hardware section (e.g., an integrated circuit or a wired logic circuit), including or not including a function of a related apparatus; furthermore, the hardware section may be constructed inside of a microcomputer.

In S11, an initialization process is executed, and the sequence proceeds to S12. The initialization process includes setting a display state of the display unit 23 to a stopped state, setting initial values of various information, and the like.

In S12, it is determined whether or not the ignition is on. If the ignition is on, the sequence proceeds to S13. If it is off, the present flowchart is ended.

In S13, a switch input process is executed, and the sequent proceeds to S14. The switch input process is a process of acquiring the rotation amount and the rotation direction when the rotary switch 22 is manipulated.

In S14, a communication process is executed, and the sequence proceeds to S15. The communication process is a process of transmitting the rotation amount and the rotation direction acquired in S13 via the communication control IC 34 and of storing the display information received via the communication control IC 34 in the RAM.

In S15, a display output process is executed, and the sequence returns to S12. The display output process is a process of displaying the set temperature on the display unit 23, and details will be described with reference to FIG. 5.

In this way, when the ignition is on, the processing from S13 to S15 is repeated.

Figure 5:
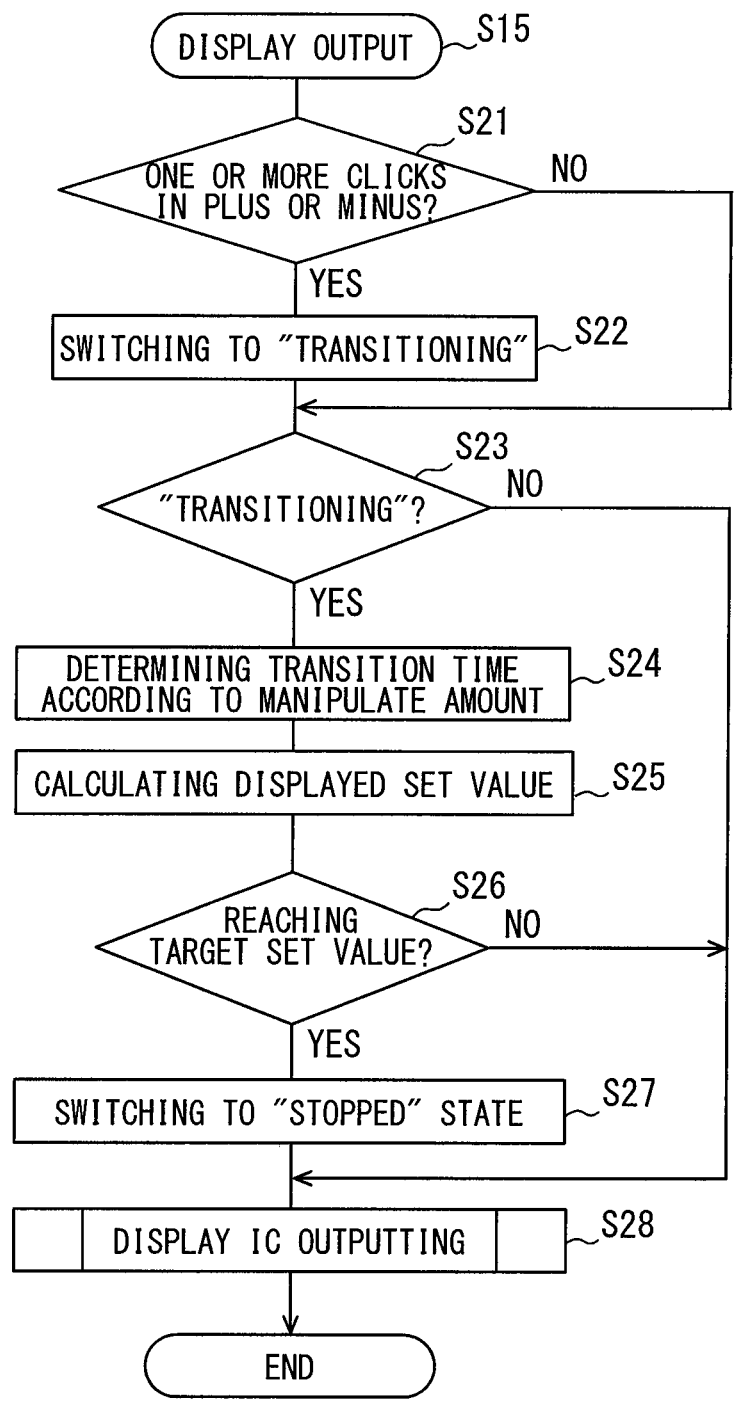
FIG. 5 is a flowchart showing a display output process of a vehicular manipulation apparatus.

The following describes the display output process in S15 with reference to FIG. 5. In S21, it is determined whether or not the rotary switch 22 accepts a manipulation with one or more clicks in either in a plus direction or in a minus direction. If the rotary switch 22 is manipulated with one or more clicks, the sequence proceeds to S22, and if not, the sequence proceeds to S23. One click indicates that the rotary switch 22 is rotated by a predetermined rotation angle, for example, 10 degrees. Further, one click in the plus direction is a rotation corresponding to one click in the upward direction in FIG. 1, and one click in the minus direction is a rotation corresponding to one click in the downward direction in FIG. 1.

In S22, since the manipulation of one or more clicks is performed, the display state is switched to the state under transitioning, and the sequence proceeds to S23. In S23, it is determined whether the display state is transitioning or not. If the display state is transitioning, the sequence proceeds to S24, and if it is not transitioning, the sequence proceeds to S28.

Figures 6, 7:
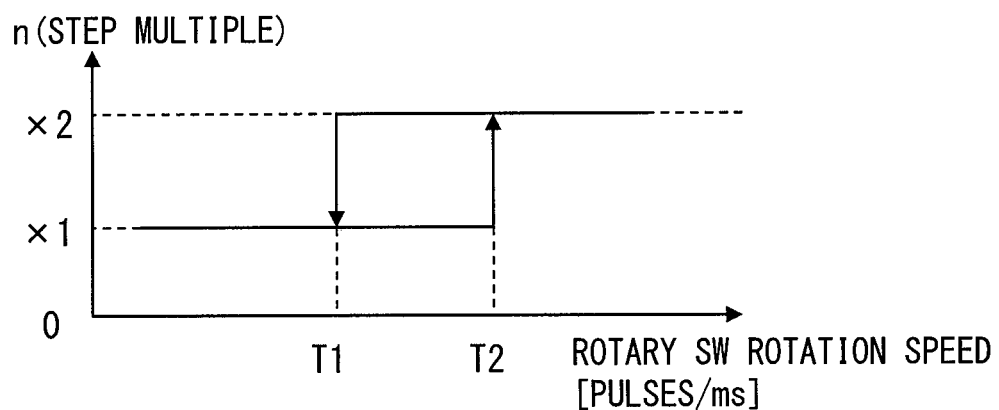
FIG. 6 is a diagram showing a manipulation amount and a transition period of time.
FIG. 7 is a graph for determining a rotation speed.

In S24, since the display state is transitioning, the transition period of time is determined according to the manipulation amount, and the sequence proceeds to S25. The transition period of time is determined using the relationship between the manipulation amount and the transition period of time shown in FIG. 6. As shown in FIG. 6, when the manipulation amount is one click, the transition period of time per step is 200 ms. When the manipulation amount is two clicks or more, the transition period of time per step is shortened to 100 ms. The total transition period of time is indicated by the multiplication of the manipulation amount and the transition period of time per step. Note that the upper limit of the total transition period of time is 500 ms. In the case of six clicks or more, the total transition period of time is thus 500 ms. Since displaying from a set value at a present time up to a set value at the latest time cannot be completed within the transition period of time, displaying is made by partially thinning out.

In S25, the set value to be displayed at the present time is calculated from the display speed and the set value displayed at the previous time, and the sequence proceeds to S26. In S26, it is determined whether or not the calculated set value reaches a target set value set by the manipulation. If it reaches, the sequence proceeds to S27, and if it does not reach, the sequence proceeds to S28. In S27, the display state is switched to the stopped state, and the sequence proceeds to S28. In S28, the display control IC 33 updates the image displayed on the display unit 23, and the present flowchart is ended.

The following describes a method of determining a determination value for setting a manipulation amount with reference to FIG. 7. As shown in FIG. 7, a step multiple is determined according to a rotation speed of the rotary switch 22. Also, in order to have hysteresis, two determination values are used; specifically, a low speed determination value T1 and a high speed determination value T2 are set to differentiate from each other. During rising, when the rotation speed exceeds the high speed determination value T2, it is determined to be a high speed and the step multiple is set to two (2). In contrast, during falling, when the rotation speed falls below the low speed determination value T1, it is determined to be a low speed and the step multiple is set to one (1). The rotation speed is the number of clicks per 40 ms, for example. The low speed determination value T1 is set to correspond to two clicks, for example; the high speed determination value T2 is set to correspond to three clicks, for example. In the case of the low speed, if three clicks are made in the past 40 ms, the rotation speed is determined to be a high speed. In contrast, in the case of the high speed, if two clicks are made in the past 40 ms, the rotation speed is determined to be a low speed.

Figure 8:
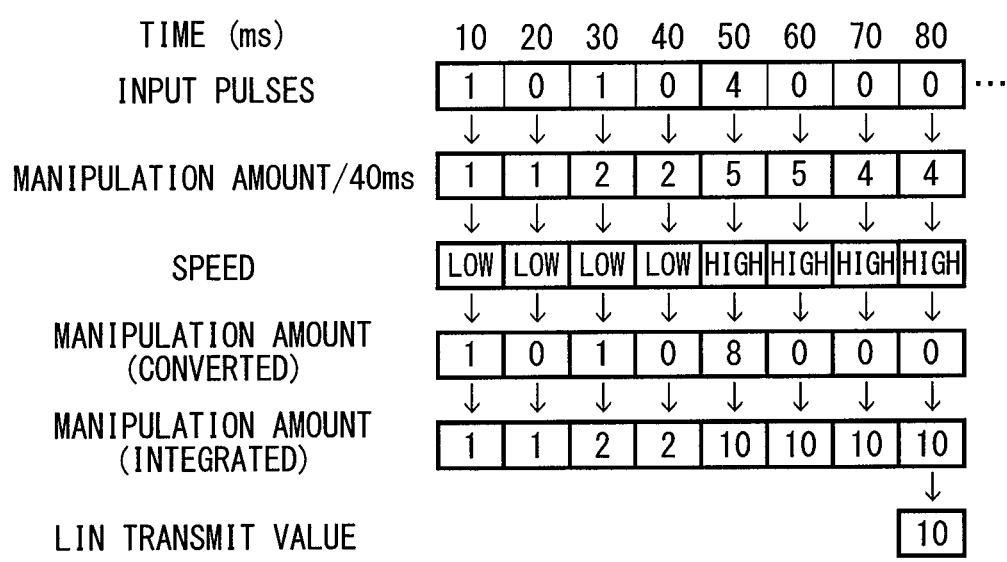
FIG. 8 is a timing chart for determining a manipulation amount.

The following describes a logic for determining a manipulation amount with reference to FIG. 8. As shown in FIG. 8, the number of input pulses at every lapse of 10 ms (i.e., input click number) is acquired. The manipulation amount for the past 40 ms is then calculated every 10 ms.

This manipulation amount is used to determine whether the rotation speed is a high speed or a low speed with reference to FIG. 7 described above. In the example shown in FIG. 8, the rotation speed is a low speed until 40 ms has elapsed. Since the number of input pulses is four at the column of 50 ms, the manipulation amount for the past 40 ms is five. The rotation speed is greater than the high speed determination value T2 based on the relationship of FIG. 7; thus the rotation speed is determined to be a high speed.

Therefore, at the column of 50 ms in FIG. 8, the rotation speed is a high speed; the manipulation amount is converted to be doubled and set to eight (8). The manipulation amount for the past 40 ms after the speed conversion is then calculated. Therefore, at the column of 50 ms, the manipulation amount comes to be ten (10). Then, the transmission value to LIN is set to 10 and is transmitted via the communication control IC 34 to the vehicular air-conditioning apparatus 11.

As a result, when the manipulation amount is large and the manipulation amount within a threshold period of time is large, the manipulation amount after the speed conversion becomes larger than the actual manipulation amount, increasing the change of the set values. In other words, even if the rotation amount is the same, the faster rotation makes the change in the set values be larger.

The following describes a process of displaying from a set value displayed at a present time to a target value that is a set value set by a manipulation, with reference to a timing chart. In the timing chart shown in FIG. 9, a switch manipulation of one click is performed at Time t11, while a data is received at Time t12. The data received at this time is not the above target value after the manipulation. Therefore, at Time t13 when the next display update is performed, the value to be displayed remains in the present value.

Figure 9:
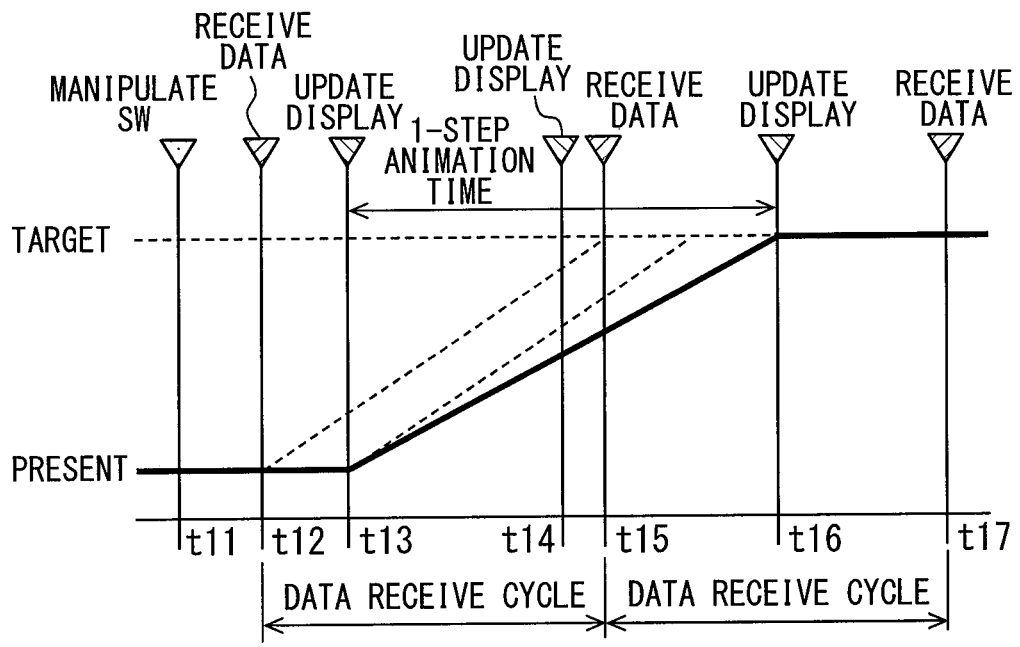
FIG. 9 is a timing chart showing a first example.

Since the manipulation is performed at Time t11, an animation control using an animation is subsequently performed to allow the display unit 23 to finally display the set value after the manipulation. At Time t14 when the next display update is performed, one or more frame images are displayed for performing an animation display to display from the present value to the target value. Then, at Time t15, the target value after the manipulation is received; thus, the target value is displayed at Time t16. In this way, the frame images are generated so that the displayed set value reaches the target value at a speed slower than the communication cycle corresponding to the data reception cycle. The broken line extending from Time t13 in FIG. 9 is a slope corresponding to the data reception cycle. The frame image is displayed so as to change at a rate smaller than the inclination of the data reception cycle, that is, at a slower speed. An animation forms are composed of a plurality of still images and are equivalent to a moving image. In contrast, a frame image, which is referred to as a film frame image or "koma" image in Japanese, is equivalent to a still image.

Figure 10:
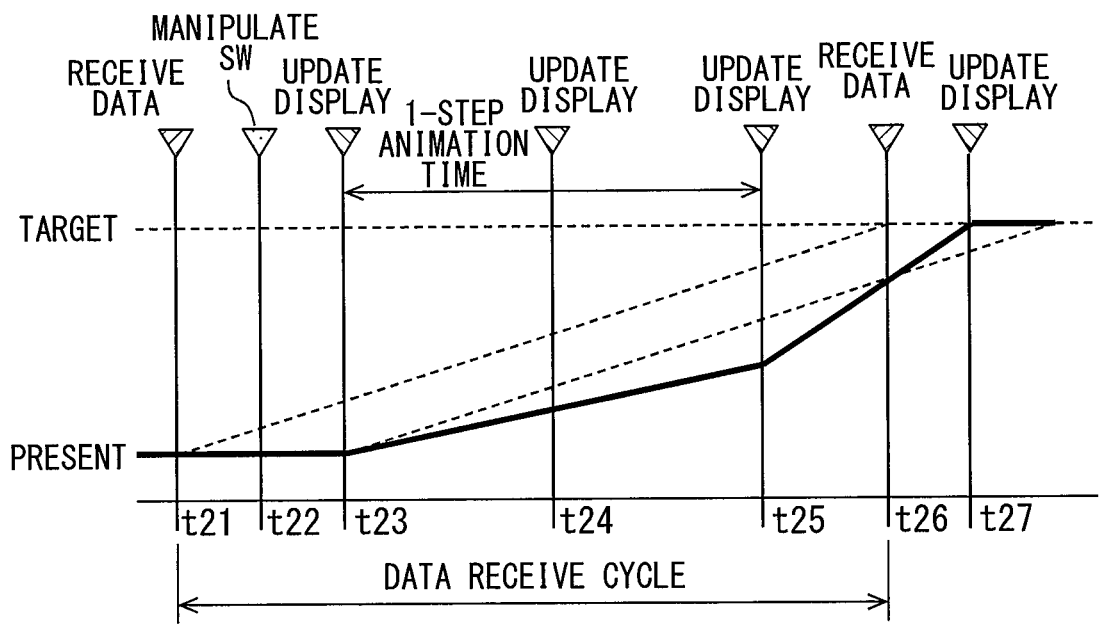
FIG. 10 is a timing chart showing a second example.

The following describes a process when the data reception cycle is longer than that in FIG. 9 with reference to FIG. 10. In the timing chart shown in FIG. 10, a data is received at Time t21 and a switch manipulation of one click is performed at Time t22. The data received at Time t21 is thus a value before the manipulation; at Time t23 when the next display update is performed, the value to be displayed remains in the present value.

Since the manipulation is performed at Time t22, an animation control using an animation is subsequently performed to allow the display unit 23 to finally display the set value after the manipulation. At Time t24 and Time t25 when the subsequent display updates are each performed, frame images for performing an animation display to display from the present value to the target value. Then, at Time t26, the target value after the manipulation is received; thus, the target value is displayed at Time t27. In this way, the data reception cycle is long; more frame images are generated than in the example shown in FIG. 9. Also, after receiving the data at Time t26, the target value is displayed at the next display update; the target value is displayed without using the frame image for performing an animation display. Therefore, the target value of the manipulation result is promptly displayed after receiving the data.

Figure 11:
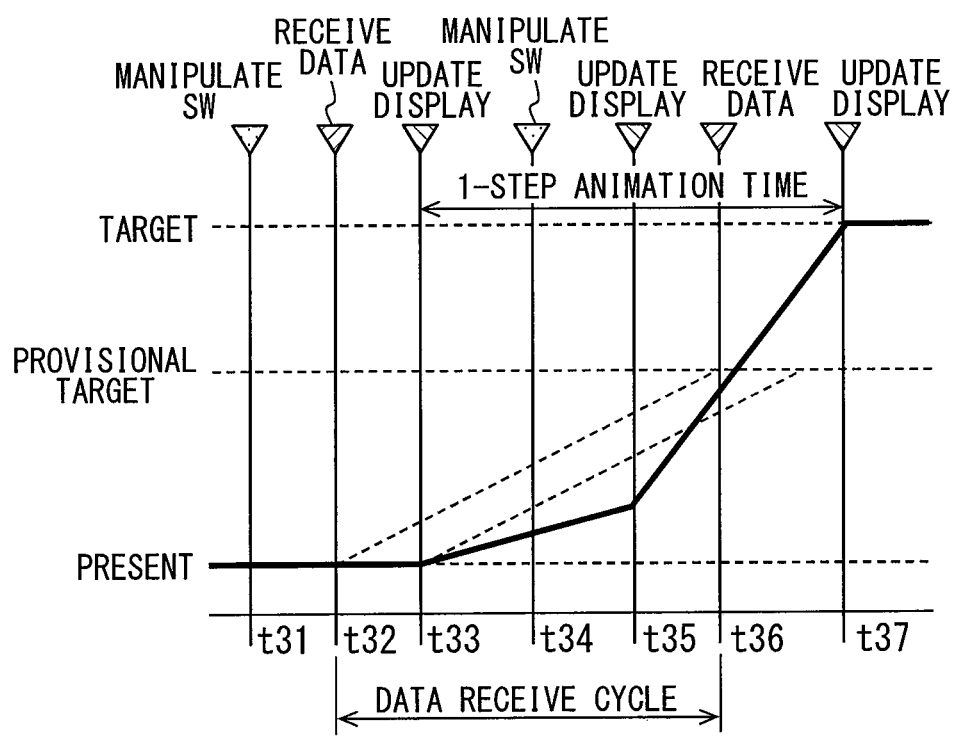
FIG. 11 is a timing chart showing a third example.

The following describes a process when the target value is changed in the middle, with reference to FIG. 11. In the timing chart shown in FIG. 11, a switch manipulation of one click is performed at Time t31, while a data is received at Time t32. The data received at this time is not the above target value after the manipulation. Therefore, at Time t33 when the next display update is performed, the value to be displayed remains in the present value.

Since the manipulation is performed at Time t31, an animation control using an animation is subsequently performed to allow the display unit 23 to finally display the set value after the manipulation. At Time t35 when the next display update is performed, frame images for performing an animation display to display from the present value to the target value. However, in the example shown in FIG. 11, the switch manipulation of one click is performed again at Time t34. Accordingly, the provisional target value with the switch manipulation at Time t31 is replaced with the target value with the switch manipulation at Time t34. Then, at Time t36, the target value after the manipulation at Time t34 is received; then, the target value is displayed at Time t37. The target value is thus displayed at Time t37; the target value is displayed without using the frame image for performing an animation display.

Figure 13:
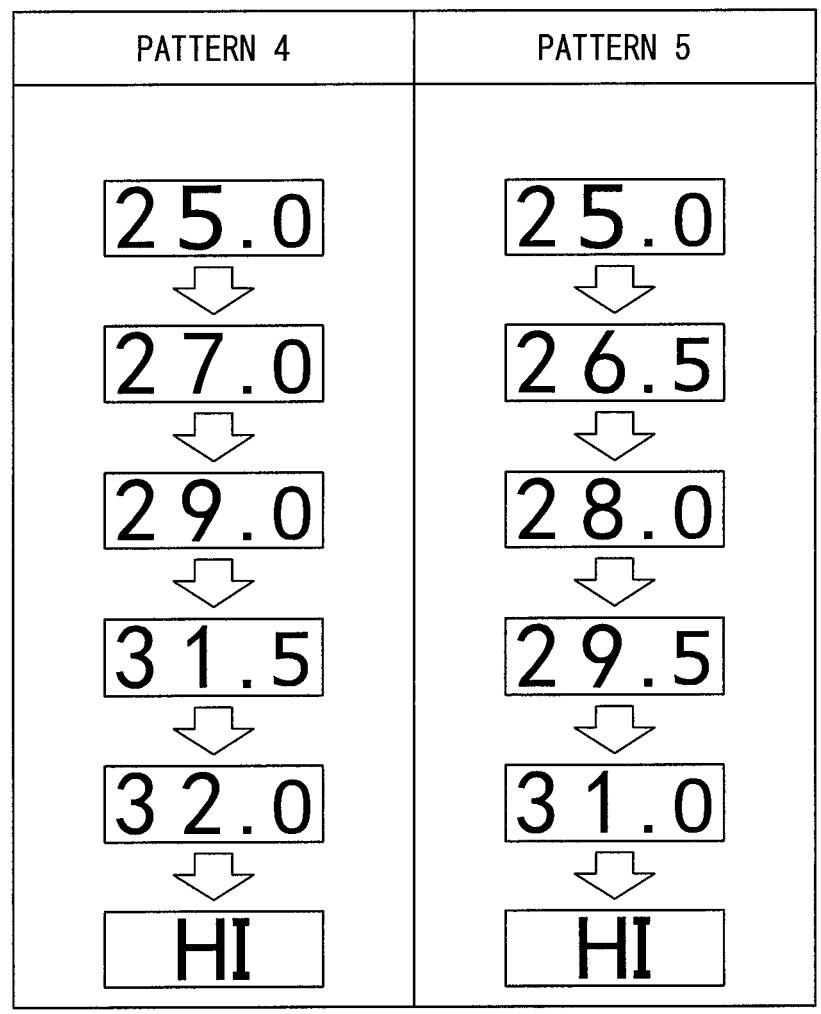
FIG. 13 is other examples of images displayed on a display unit.

The following describes images displayed on the display unit 23 with reference to FIGS. 12 and 13. The case where one click changes a value of 0.5 will be explained. As shown in Pattern 1 of FIG. 12, in order to display from the present value of 19.5 to the target value of 19.0 with one click, the display unit 23 performs an animation display using a frame image for simultaneously displaying a present value displayed at a present time and a target value to be displayed at a next time. Pattern 1 has one frame image for simultaneously displaying a present value and a target value.

In Pattern 2, a plurality of frame images each simultaneously displaying a present value and a target value are used, for example, two frame images are used for performing an animation display to indicate the change from the present value 19.5 to the target value 19.0, both of which are the same as those in Pattern 1. Therefore, the period of time for performing a one-step animation display from the same present value to the same target value can also be adjusted by increasing or decreasing the number of frame images to be displayed. Also, the period of time for performing a one-step animation display animation can be adjusted by changing the period of time to display each frame image.

In Pattern 3, when a plurality of clicks are made at one time, a frame image is formed so as to broaden a change width between steps by changing from by 0.5 to by 1.5. This can shorten the period of time for changing from 28.5 to 30.0.

In Patterns 4 and 5 shown in FIG. 13, a display is indicated which changes from 25.0 to HI. Here, HI, which is a set temperature exceeding 32 degrees, is an upper limit value of the set temperature. When the set temperature is increased from 32 degrees, it becomes HI.

In Pattern 4 and Pattern 5, a frame image for simultaneously displaying a present value and a target value, which is primarily displayed at the position of each arrow, is omitted from the drawing. In Patterns 4 and 5, a plurality of clicks are made at one time; the images to be displayed step by step are formed with change widths each larger than 0.5 by thinning out displayed steps, instead of a change width of 0.5. Specifically, in Pattern 4, the first half is displayed in a stepwise manner with a large change width (e.g., 2.0), while the second half is displayed in a stepwise manner with a small change width (e.g., 0.5). In Pattern 5, steps are thinned out uniformly so that the display to reach HI in a stepwise manner is shown with change widths (e.g., 1.5) each larger than 0.5. In another pattern, the first half and the second half may be each displayed in a stepwise manner with a small change width (e.g., 0.5), by thinning out steps in the middle between the first half and the second half.

As described above, as the number of clicks increases, the period of time for displaying with an animation becomes long; in contrast, as the number of clicks is equal to or greater than a predetermined number of clicks, the period of time displayed with an animation is fixed at a predetermined maximum period of time. This can adjust the period of time up to reaching the set value even when the number of clicks is large.

As described above, the vehicular manipulation apparatus 10 of the present embodiment controls the display unit 23 to display, in an animation or in a stepwise manner, the change from the set value before a manipulation to the set value after the manipulation during a period of time from when the rotary switch 22 accepts the manipulation to when the communication control IC 34 acquires the information. The displayed image is thus changed even if the information from the vehicular air-conditioning apparatus 11 has not been received after the manipulation. This can reduce a delay from when a manipulation is made to when an image to be displayed is changed after the manipulation, reducing a feeing of strangeness given to the user.

In addition, in displaying the change due to a manipulation step-by-step with a plurality of steps, the controller broadens a change width between the steps in cases where a manipulation amount within a predetermined threshold period of time is equal to or greater than a predetermined threshold manipulation amount, as compared with cases where the manipulation amount within the threshold period of time is less than the threshold manipulation amount. As a result, when the manipulation amount is large, the change is displayed with a large change width (e.g., a change width of 2.0) between the steps instead of a change width of 0.5 set primarily. This can display the change after being thinned out. An example is described where the set value is a temperature. That is, when a manipulation amount is large, the change in a set temperature is displayed with a large change width (e.g., a change width of 2.0 degrees centigrade) between the steps instead of a change width of 0.5 degree centigrade set primarily. Even if the manipulation amount is large, the set value may be displayed to follow the manipulation. This can make a user reduce a feeling of strangeness in between the manipulation amount and the change in the set value.

Further, in the present embodiment, in displaying a set value step-by-step by using a plurality of steps, the set value is displayed in an animation using a frame image(s) each for displaying simultaneously a set value displayed at a present time and a set value to be displayed at a next time. This controls a period of time for displaying from the present value to the target set value by changing the number of the frame images each for displaying simultaneously a set value displayed at a present time and a set value displayed at a next time even if the change in the set values is one step. Therefore, immediately after clicking, such a frame image each displaying simultaneously a set value displayed at a present time and a set value displayed at a next time may be displayed, reducing the time lag from the manipulation to the start of the change in the displayed image. The user is enabled to be relieved from a feeling of strangeness.

Furthermore, in the present embodiment, the communication control IC 34 periodically communicates with the vehicular air-conditioning apparatus 11 in compliance with a predetermined communication cycle. Then, after the communication cycle has elapsed since the manipulation to the rotary switch 22, the ECU 32 displays the set value after the manipulation. This can prevent the set value from being erroneously displayed on the display unit 23.

Further, in the present embodiment, as a difference between a set value presently displayed and a set value acquired by the communication control IC 34 increases, the change width between the steps in the stepwise change is adjusted to be increased. As a result, the control is enabled to display a latest set value when updating the displayed image after the communication control IC 34 acquires the latest set value. This can shorten the period of time until the latest information is displayed.

Further, in the present embodiment, the manipulation unit is realized with a rotary switch 22 that is rotated. As a result, by manipulating the rotary switch 22, the user can stepwise input a set value while intuitively inputting the set value.

Furthermore, in the present embodiment, the set temperature of the vehicular air-conditioning apparatus is input with the rotary switch 22. The set temperature of the vehicular air-conditioning apparatus 11 is displayed on the display unit 23 based on the information communicated when the vehicular air-conditioning apparatus 11 communicates with the vehicular manipulation apparatus 10. The control relationship is thus established such that vehicular air-conditioning apparatus 11 is a master and the vehicular manipulation apparatus 10 is a slave. The information displayed on the display unit 23 cannot be updated until the set temperature of the vehicular air-conditioning apparatus 11 is changed even if the vehicular manipulation apparatus 10 is manipulated. However, in the present embodiment, the stepwise display or the animation display is made before the displayed image is finalized. The user can thus be provided with an illusion of the setting being updated instantaneously. This can provide the user with the vehicular manipulation apparatus 10 with excellent manipulation feeling.

The operations and effects of the present embodiment are summarized as follows. That is, the period of time until the user manipulation is reflected on the displayed image can be shortened and the manipulation response can be improved. Even when the rotary switch 22 is quickly rotated or the manipulation amount at one time is large, the displayed image is switched quickly, reducing the delay in the displayed image. By contrast, when the manipulation amount is small, the display transition is smoothly performed with the frame image, so that the display quality can be improved.

Second Embodiment

Figure 14:
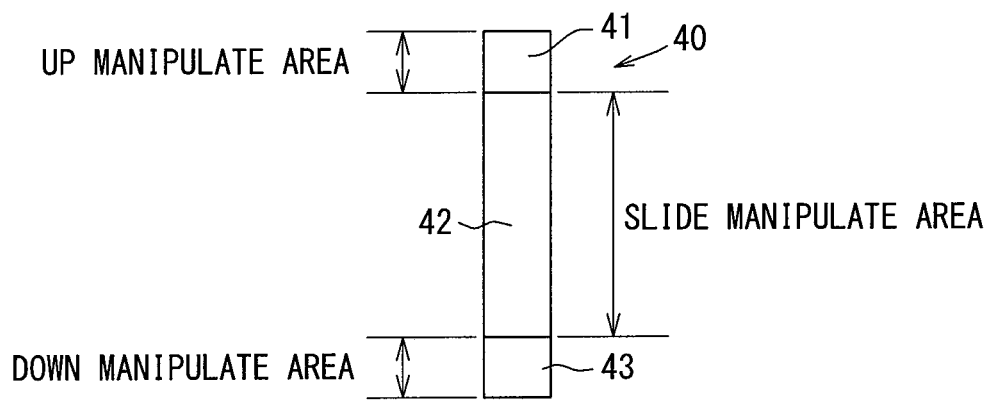
FIG. 14 is a diagram showing a vehicular manipulation apparatus according to a second embodiment.
Figure 15:
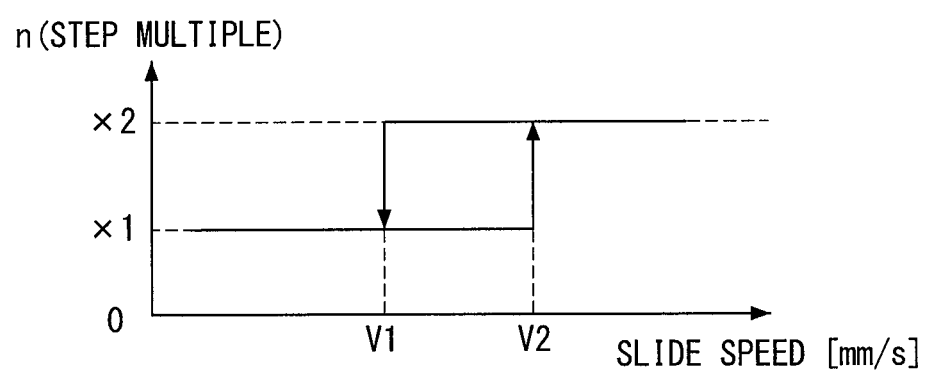
FIG. 15 is a graph for determining a slide speed.

The following describes a second embodiment of the present disclosure with reference to FIGS. 14 and 15. The present embodiment is characterized in that the configuration of a manipulation unit (or manipulation switch, manipulation interface) is realized with a capacitive type slide switch. As shown in FIG. 14, a slider 40, which is an electrostatic capacity type slide switch, can perform an input with a user's touching manipulation.

The slider 40 has an area which can be manipulated; the area is long and thin. The area includes a slide manipulation area 42 in the center, an up manipulation area 41 in the upper portion, and a down manipulation area 43 in the lower portion.

In the slide manipulation area 42, the set value increases when the position of a fingertip is changed by the fingertip sliding upward while touching the slide manipulation area 42. Similarly, the set value decreases when the position of the fingertip is changed by the fingertip sliding downward while touching the slide manipulation area 42. As shown in FIG. 15, an input hysteresis is set so that the change step becomes larger as the slide speed increases. For example, when the slide speed exceeds a second speed V2, e.g., 500 mm/s, the slide speed is determined as a high speed and the step multiple is set to two (2). Further, when the slide speed falls below a first speed V1, e.g., 250 mm/s, the slide speed is determined as a low speed and the step multiple is set to one (1). Further, in the up manipulation area 41, each one touching manipulation can input one click for increase; in the down manipulation area 43, each one touching manipulation can input one click for decrease.

Even in such a slider 40, similarly to the above-described rotary switch 22, an image to be displayed at a display update is determined depending on a manipulation amount. This can provide the same operations and effects as those of the above-described first embodiment.

Other Embodiments

Although preferred embodiments of the present disclosure have been described above, the present disclosure is not limited to the above-described embodiments, and various modifications are contemplated as exemplified below.

It should be understood that the configurations described in the above-described embodiments are example configurations, and the present disclosure is not limited to the foregoing descriptions. The scope of the present disclosure encompasses claims and various modifications of claims within equivalents thereof.

In the first embodiment described above, a rotary switch 22 is used for changing a set temperature of a conditioned air in an air conditioned apparatus. There is no need to be limited thereto. For example, the rotary switch 22 may also apply to other uses or other apparatuses, such as changing a blowing amount and a blowing mode of a conditioned air, or changing the volume of an audio device.

In the first embodiment described above, when the rotary switch 22 is manipulated, the display is controlled to use a stepwise display or an animation display. There is no need of always using a stepwise display or or an animation display. For example, when a set temperature is changed by remotely manipulating a navigation apparatus using a remote control or the like, the control may be performed to immediately display the set temperature. In addition, suppose a vehicular air-conditioning apparatus 11 with a left-and-right independent control. In such an apparatus, if the dual switch is turned on for activating a predetermined manipulation (e.g., left-right independent control) is turned on, the temperature on the passenger's seat side may be immediately displayed.

In the first embodiment described above, the display unit 23 digitally displays the set temperature by using numerical values. There is no need to be limited to the digital display with numerical values. For example, the blowing mode may be displayed as an image display, or a digital display with alphabets or symbols.

In the first embodiment described above, an animation display is always performed. Another configuration may be provided which does not perform an animation display. For example, if one click is made for the change, an animation display is performed. In contrast, if several clicks are made for the change, a stepwise display may be performed, instead of an animation display. Also, even if one click is made for the change, a stepwise display may be performed by employing a change width that is decreased to 0.1, for instance.

In the first embodiment described above, the functions realized by the vehicular manipulation apparatus 10 may be realized by hardware and software different from the above, or a combination thereof. For example, the vehicular manipulation apparatus 10 may communicate with a different control apparatus, and the different control apparatus may execute part or all of the processes.

Although the present disclosure has been described in accordance with the embodiments, it is understood that the present disclosure is not limited to the embodiments and structures disclosed therein. The present disclosure may cover various modification examples and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicular manipulation apparatus manipulating a different apparatus mounted to a vehicle, comprising:
a manipulation unit configured to accept a manipulation to input a set value of a control parameter step-by-step to control the different apparatus;
a communication unit configured
to communicate with the different apparatus,
to transmit manipulation information including a manipulation amount of the manipulation accepted by the manipulation unit to the different apparatus, and
to receive a received set value of the different apparatus;
a display unit configured to digitally display the received set value received by the communication unit; and
a controller configured to control a displayed image displayed on the display unit based on the received set value received by the communication unit,
wherein:
the controller is configured to display a change due to the manipulation on the display unit step-by-step by using a plurality of steps with a change width between the steps;
under a state where the change due to the manipulation is displayed step-by-step, the controller broadens the change width in a case where a manipulation amount within a predetermined threshold period of time is equal to or greater than a predetermined threshold manipulation amount, as compared with a case where the manipulation amount within the threshold period of time is less than the threshold manipulation amount; and
the controller is configured to display the displayed image step-by-step in a period of time from when the manipulation is accepted by the manipulation unit to when information is acquired by the communication unit, by changing the displayed image step-by-step from a set value before the manipulation is accepted to a set value after the manipulation is accepted.

2. The vehicular manipulation apparatus according to claim 1, wherein
in displaying the displayed image step-by-step, the controller is configured to display the displayed image in an animation, the animation comprising a frame image indicating simultaneously a set value displayed at a present time and a set value displayed at a next time.

3. The vehicular manipulation apparatus according to claim 2, wherein
in displaying the change due to the manipulation step-by-step,
a period of time for displaying the displayed image in the animation is lengthened as the manipulation amount within the threshold period of time increases when the manipulation amount within the threshold period of time is less than the threshold manipulation amount
whereas the period of time for displaying the displayed image in the animation is fixed to a predetermined maximum period of time when the manipulation amount within the threshold period of time is equal to or greater than the threshold manipulation amount.

4. The vehicular manipulation apparatus according to claim 3, wherein
the controller is configured
to display the displayed image in the animation comprising a plurality of the frame images each indicating simultaneously a set value displayed at a present time and a set value displayed at a next time and
to adjust the plurality of the frame images according to the period of time for displaying the displayed image in the animation.

5. The vehicular manipulation apparatus according to claim 1, wherein:
the communication unit is configured to periodically communicate with the different apparatus in compliance with a predetermined communication cycle; and
the controller is configured to display a set value after the manipulation is accepted by the manipulation unit, after the communication cycle elapses from a time when the manipulation is accepted by the manipulation unit.

6. The vehicular manipulation apparatus according to claim 5, wherein
the controller is configured to adjust the change width to be broadened as a difference increases, the difference being between a set value displayed at a present time and the received set value received by the communication unit.

7. The vehicular manipulation apparatus according to claim 1, wherein
the manipulation unit is a rotary switch to accept a rotating manipulation.

8. The vehicular manipulation apparatus according to claim 1, wherein
the manipulation unit is a slide switch to accept a touching manipulation.

9. The vehicular manipulation apparatus according to claim 1, wherein:
the different apparatus is a vehicular air-conditioning apparatus; and
the set value is a set value of a control parameter that controls the vehicular air-conditioning apparatus.

10. A vehicular manipulation apparatus manipulating a different apparatus mounted to a vehicle, comprising:
a manipulation unit configured to accept a manipulation to input a set value of a control parameter step-by-step to control the different apparatus;
a communication unit configured
to communicate with the different apparatus,
to transmit manipulation information including a manipulation amount of the manipulation accepted by the manipulation unit to the different apparatus, and
to receive a received set value of the different apparatus;
a display unit configured to digitally display the received set value received by the communication unit; and
a controller configured to control a displayed image displayed on the display unit based on the received set value received by the communication unit,
wherein:
the controller is configured to display a change due to the manipulation on the display unit step-by-step by using a plurality of steps with a change width between the steps;
under a state where the change due to the manipulation is displayed step-by-step, the controller broadens the change width in a case where a manipulation amount within a predetermined threshold period of time is equal to or greater than a predetermined threshold manipulation amount, as compared with a case where the manipulation amount within the threshold period of time is less than the threshold manipulation amount;

in displaying the displayed image step-by-step, the controller is configured to display the displayed image in an animation, the animation comprising a frame image indicating simultaneously a set value displayed at a present time and a set value displayed at a next time; and in displaying the change due to the manipulation step-by-step, a period of time for displaying the displayed image in the animation is lengthened as the manipulation amount within the threshold period of time increases when the manipulation amount within the threshold period of time is less than the threshold manipulation amount whereas the period of time for displaying the displayed image in the animation is fixed to a predetermined maximum period of time when the manipulation amount within the threshold period of time is equal to or greater than the threshold manipulation amount.

11. The vehicular manipulation apparatus according to claim 10, wherein the controller is configured to display the displayed image step-by-step in a period of time from when the manipulation is accepted by the manipulation unit to when information is acquired by the communication unit, by changing the displayed image step-by-step from a set value before the manipulation is accepted to a set value after the manipulation is accepted.

12. The vehicular manipulation apparatus according to claim 10, wherein the controller is configured to display the displayed image in the animation comprising a plurality of the frame images each indicating simultaneously a set value displayed at a present time and a set value displayed at a next time and to adjust the plurality of the frame images according to the period of time for displaying the displayed image in the animation.

13. The vehicular manipulation apparatus according to claim 10, wherein:

the communication unit is configured to periodically communicate with the different apparatus in compliance with a predetermined communication cycle; and the controller is configured to display a set value after the manipulation is accepted by the manipulation unit, after the communication cycle elapses from a time when the manipulation is accepted by the manipulation unit.

14. The vehicular manipulation apparatus according to claim 13, wherein the controller is configured to adjust the change width to be broadened as a difference increases, the difference being between a set value displayed at a present time and the received set value received by the communication unit.

15. The vehicular manipulation apparatus according to claim 10, wherein the manipulation unit is a rotary switch to accept a rotating manipulation.

16. The vehicular manipulation apparatus according to claim 10, wherein the manipulation unit is a slide switch to accept a touching manipulation.

17. The vehicular manipulation apparatus according to claim 10, wherein:

the different apparatus is a vehicular air-conditioning apparatus; and the set value is a set value of a control parameter that controls the vehicular air-conditioning apparatus.

* * * * *